United States Patent
Vitucci et al.

(10) Patent No.: US 7,749,466 B2
(45) Date of Patent: Jul. 6, 2010

(54) CATALYTIC REACTOR

(75) Inventors: John Vitucci, Spring, TX (US); Michael Joseph Bowe, Preston (GB); Lawrence Andrew Stryker, La Crescent, MN (US); Douglas Eugene Decker, La Crosse, WI (US); Vinh N. Le, Houston, TX (US)

(73) Assignee: CompactGTL PLC, Oxfordshire (GB)

( * ) Notice: Subject to any disclaimer, the term of this patent is extended or adjusted under 35 U.S.C. 154(b) by 431 days.

(21) Appl. No.: 11/813,867

(22) PCT Filed: Jan. 11, 2006

(86) PCT No.: PCT/GB2006/050008

§ 371 (c)(1),
(2), (4) Date: Sep. 28, 2007

(87) PCT Pub. No.: WO2006/075193

PCT Pub. Date: Jul. 20, 2006

(65) Prior Publication Data

US 2008/0193346 A1    Aug. 14, 2008

(30) Foreign Application Priority Data

Jan. 15, 2005    (GB)    ................ 0500837.0

(51) Int. Cl.
*B01J 8/02*    (2006.01)
*B01J 8/04*    (2006.01)
*B01J 10/00*    (2006.01)
*B01J 19/00*    (2006.01)
*B01J 35/02*    (2006.01)
*B01J 12/00*    (2006.01)

(52) U.S. Cl. ............. 422/211; 422/129; 422/190; 422/193; 422/197

(58) Field of Classification Search ............ 422/190, 422/197, 129, 177, 193, 211
See application file for complete search history.

(56) References Cited

U.S. PATENT DOCUMENTS 4,544,544 A    10/1985    Dang Vu et al.

(Continued)

FOREIGN PATENT DOCUMENTS

DE    10046691 C1    4/2002

(Continued)

OTHER PUBLICATIONS

U.S. Appl. No. 11/813,866, Bowe.

(Continued)

*Primary Examiner*—Walter D Griffin
*Assistant Examiner*—Natasha Young
(74) *Attorney, Agent, or Firm*—McDermott Will & Emery

(57) ABSTRACT

A compact catalytic reactor for Fischer-Tropsch synthesis (50) comprises a reactor module (70) defining a multiplicity of first and second flow channels arranged alternately, for carrying a gas mixture, and a coolant respectively. A removable gas-permeable catalyst structure (82) with a substrate for example of metal foil is provided in each flow channel in which the synthesis reaction is to occur. The reactor module (70) is enclosed within a pressure vessel (90), the pressure within the pressure vessel being arranged to be at a pressure substantially that of the high pressure reacting gas mixture. Consequently all the flow channels within the module are either at the pressure of their surroundings, or are under compression; no parts are under tension. This simplifies the design of the module, and increases the proportion of reactor volume which can be occupied by the catalyst.

15 Claims, 2 Drawing Sheets

U.S. PATENT DOCUMENTS

| | | | |
|---|---|---|---|
| 4,686,238 A | 8/1987 | Bode et al. | |
| 5,019,356 A | 5/1991 | Silberring | |
| 5,695,007 A | 12/1997 | Fauconnier | |
| 6,203,587 B1 | 3/2001 | Lesieur et al. | |
| 6,709,640 B1 | 3/2004 | Romatier | |
| 7,082,651 B2 | 8/2006 | Ninomiya | |
| 7,186,388 B2 | 3/2007 | Bowe et al. | |
| 7,189,271 B2 | 3/2007 | Maude | |
| 7,201,883 B2 | 4/2007 | Bowe et al. | |
| 7,223,373 B2 | 5/2007 | Maude | |
| 7,235,218 B2 | 6/2007 | Bowe | |
| 7,351,750 B2 | 4/2008 | Bowe | |
| 2003/0049184 A1 | 3/2003 | Kimata et al. | |
| 2004/0081600 A1* | 4/2004 | Moreno et al. | 422/240 |
| 2004/0102530 A1 | 5/2004 | Borsa et al. | |
| 2004/0251001 A1* | 12/2004 | Maude | 165/147 |
| 2004/0258587 A1* | 12/2004 | Bowe et al. | 422/222 |

FOREIGN PATENT DOCUMENTS

| | | |
|---|---|---|
| DE | 10226204 A1 | 12/2003 |
| EP | 81948 A * | 6/1983 |
| EP | 0600621 | 6/1994 |
| EP | 0977293 | 2/2000 |
| EP | 1321184 | 6/2003 |
| WO | 01 51194 A1 | 7/2001 |
| WO | 03048034 A1 | 6/2003 |
| WO | 2004050799 A1 | 6/2004 |

OTHER PUBLICATIONS

PCT Preliminary Report (PCT/BG 2006/050008) filed Mar. 13, 2007.

PCT Search Report and Written Opinion (PCT/GB2006/050008) dated Mar. 24, 2007.

GB Search Report (GB0500837.0) filed May 18, 2005.

English language abstract of DE 10046691.

English language abstract of DE 10226204.

* cited by examiner

CATALYTIC REACTOR

This invention relates to a catalytic reactor suitable for use in a chemical process to convert natural gas to longer-chain hydrocarbons, in particular for performing Fischer-Tropsch synthesis, and to a plant including such catalytic reactors to perform the process.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid under ambient conditions. The two stages of the process, steam/methane reforming and Fischer-Tropsch synthesis, require different catalysts, and heat to be transferred to or from the reacting gases, respectively, as the reactions are respectively endothermic and exothermic. The reactors for the two different stages must comply with somewhat different requirements: Fischer-Tropsch synthesis is usually carried out at a higher pressure but a lower temperature than steam/methane reforming; and in the heat transfer channels of the Fischer-Tropsch reactor only a coolant fluid is required, whereas the heat required for steam/methane reforming would typically be provided by catalytic combustion, and so would require a suitable catalyst.

In each case the reactor is preferably formed as a stack of plates, with flow channels defined between the plates, the flow channels for the different fluids alternating in the stack. In those channels that require a catalyst, this is preferably in the form of a corrugated metal substrate carrying the catalyst in a ceramic coating, such corrugated structures being removable from the channels when the catalyst is spent. However, where there is a large pressure difference between the two fluids, this will tend to cause the plates to bend, so heat transfer between the catalyst structure and the plates is impeded, and it may be difficult to remove or replace the catalyst structure; yet if the plates are to be strong enough to resist the pressure difference, then the plates will have to be thicker and/or the channels narrower, and the flow volume as a proportion of the total volume of the reactor will tend to be less.

According to the present invention there is provided a compact catalytic reactor for Fischer-Tropsch synthesis comprising a reactor module defining a multiplicity of first and second flow channels arranged alternately in the module, for carrying first and second fluids respectively, the first fluid being a gas mixture which undergoes Fischer-Tropsch synthesis and whose pressure is above ambient pressure, and the second fluid being a coolant fluid; wherein each flow channel in which a chemical reaction is to take place contains a removable gas-permeable catalyst structure incorporating a metal substrate; wherein the reactor module is enclosed within a pressure vessel, the pressure within the pressure vessel being arranged to be at a pressure substantially equal to that of whichever fluid is at the higher pressure.

Since the pressure within the pressure vessel is substantially that of the fluid at higher pressure, all the flow channels within the stack of plates are either at the pressure of their surroundings, or are under compression. Consequently no parts of the stack of plates are under tension. Preferably the gas mixture is the fluid at higher pressure, and this gas mixture is arranged to flow through at least part of the pressure vessel either to reach the first flow channels or (after it has undergone Fischer-Tropsch synthesis) to leave the first flow channels. A benefit of arranging that the gas mixture that has undergone Fischer Tropsch synthesis then flows through the pressure vessel is that the pressure vessel can provide a first stage of separation between liquid droplets of product hydrocarbons and gaseous products.

Hence, in a second aspect, the present invention provides such a compact catalytic reactor for Fischer-Tropsch synthesis comprising a suitable reactor module enclosed within a pressure vessel, but wherein the pressure within the pressure vessel is arranged to be substantially equal to that in the Fischer-Tropsch reaction channels.

The Fischer-Tropsch reaction is typically carried out at a temperature about 200° C., so a wide range of materials may be selected for the reactor module. For example the reactor module may be made of an aluminium alloy, stainless steel or high-nickel alloys, or other steel alloys.

Preferably the metal substrate for the catalyst structure is a steel alloy that forms an adherent surface coating of aluminium oxide when heated, for example an aluminium-bearing ferritic steel such as iron with 15% chromium, 4% aluminium, and 0.3% yttrium (eg Fecralloy™). When this metal is heated in air it forms an adherent oxide coating of alumina, which protects the alloy against further oxidation and against corrosion. Where the ceramic coating is of alumina, this appears to bond to the oxide coating on the surface. The substrate may be a wire mesh or a felt sheet, but the preferred substrate is a thin metal foil for example of thickness less than 100 μm, and the substrate may be corrugated, dimpled or pleated.

Such a catalyst structure incorporating catalytic material may be inserted into a flow channel, flow channels for the Fischer-Tropsch reaction alternating with flow channels to remove heat. The metal substrate of the catalyst structure within the flow channels enhances heat transfer and catalyst surface area. The catalyst structures are removable from the channels in the module, so they can be replaced if the catalyst becomes spent.

The reactor module may comprise a stack of plates. For example, first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. The stack of plates forming the reactor module is bonded together for example by diffusion bonding, brazing or hot isostatic pressing. A particular benefit of the present invention is that the proportion of the volume of the reactor module consisting of structural material (not including the catalyst) may be less than 60%, preferably being less than 50%, and may even be less than 35%.

Hence a plant for processing natural gas to obtain longer chain hydrocarbons may incorporate a steam/methane reforming reactor, to react methane with steam to form synthesis gas, and a Fischer-Tropsch reactor of the invention to generate longer-chain hydrocarbons. To ensure the required good thermal contact, the channels for the Fischer-Tropsch reaction are preferably less than 10 mm deep.

The invention will now be further and more particularly described, by way of example only, and with reference to the accompanying drawings, in which.

The invention is of relevance to a chemical process for converting natural gas (primarily methane) to longer chain hydrocarbons. The first stage of this process involves steam reforming, that is to say the reaction of the type:

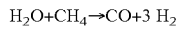

This reaction is endothermic, and may be catalysed by a rhodium or platinum/rhodium catalyst in a first gas flow channel. The heat required to cause this reaction may be provided by combustion of an inflammable gas such as methane or hydrogen, which is exothermic and may be catalysed by a palladium catalyst in an adjacent second gas flow channel. In both cases the catalyst is preferably on a stabilised-alumina support which forms a coating typically less than 100 μm thick on the metallic substrate. The combustion reaction may take place at atmospheric pressure, but the reforming reaction may take place at between 4 and 5 atmospheres. The heat generated by the combustion would be conducted through the metal sheet separating the adjacent channels.

The gas mixture produced by the steam/methane reforming is then used to perform a Fischer-Tropsch synthesis to generate a longer chain hydrocarbon, that is to say:

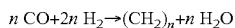

which is an exothermic reaction, occurring at an elevated temperature, typically between 190° C. and 280° C., and an elevated pressure typically between 1.8 MPa and 2.1 MPa (absolute values), in the presence of a catalyst such as iron, cobalt or fused magnetite. The preferred catalyst for the Fischer-Tropsch synthesis comprises a coating of gamma-alumina of specific surface area 140-230 $m^2/g$ with about 10-40% cobalt (by weight compared to the alumina), and with a promoter such as ruthenium, platinum or gadolinium which is less than 10% the weight of the cobalt, and a basicity promoter such as lanthanum oxide.

Figure 1:
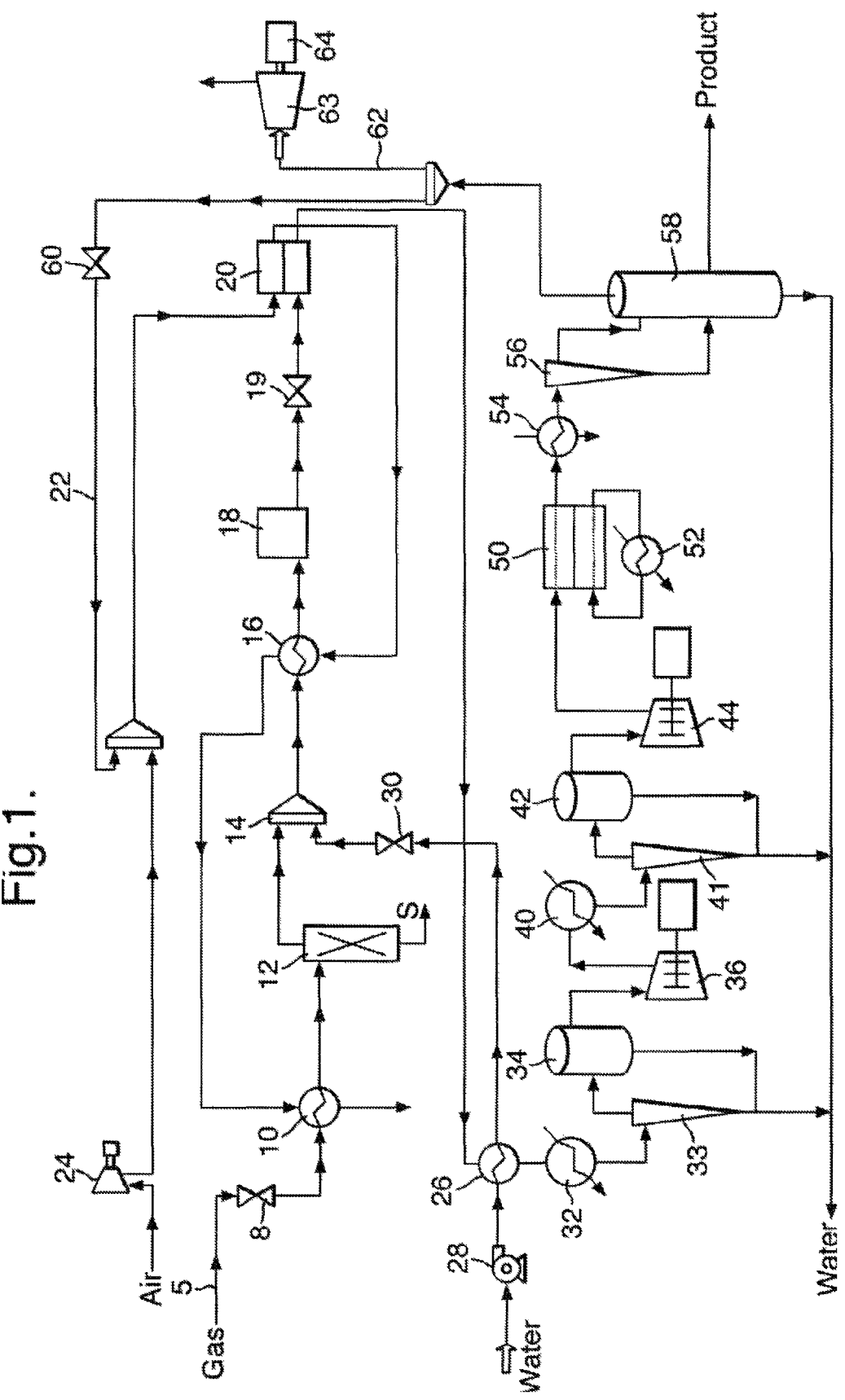
FIG. 1 shows a flow diagram of a chemical plant incorporating a reactor of the invention.

Referring now to FIG. 1, the overall chemical process is shown as a flow diagram in which the components of the plant are shown. The natural gas feed 5 consists primarily of methane with, in this example, a percentage of higher hydrocarbons $C_2$ to $C_{11}$. Typically these higher hydrocarbons are present at up to 10% v/v depending on the source of natural gas. The gas feed 5 may for example be at a pressure of 1.0 MPa (10 atmospheres).

The gas pressure is regulated by a valve 8 to 0.6 MPa and then the gas 5 is pre-heated to about 400° C. in a heat exchanger 10 using the hot exhaust gas from catalytic combustion, and is then fed to a solid bed de-sulphurising system 12. The de-sulphurised natural gas 5 is then mixed with steam, for example in a fluidic vortex mixer 14. The gas/steam mixture is heated in a heat exchanger 16 using the hot exhaust gas from catalytic combustion so that the gas mixture is at a temperature of 500° C. The mixture enters an adiabatic fixed bed pre reformer 18 where it contacts a nickel or a platinum/rhodium based methanation catalyst. The higher hydrocarbons react with the steam to form methane and CO.

The gas exits the pre-reformer 18 at a lower temperature typically 450° C. The pressure is then let down by a valve 19 to 0.45 MPa (absolute pressure) before entering a reformer 20. The reformer 20 is a compact catalytic reactor of the type described above, made from a stack of plates which define flow paths for endothermic and exothermic reactions which are in good thermal contact, and which contain appropriate catalysts. The reformer channels in the reformer 20 contain a reforming catalyst, and the steam and methane react to form carbon monoxide and hydrogen. The temperature in the reformer increases from 450° C. at the inlet to about 800-850° C. at the outlet. The flow rates of steam and gas supplied to the mixer 14 are such that the steam:carbon molar ratio fed to the reformer 20 is between 1.2-1.6 and preferably between 1.3 and 1.5. Depending on the higher hydrocarbon content of the gas 5, the steam to carbon ratio at the inlet to the pre-reformer 18 will therefore need to be higher than this.

The heat for the endothermic reactions in the reforming reactor 20 is provided by the catalytic combustion of a mixture of short chain hydrocarbons and hydrogen which is the tail gas 22 from the Fischer-Tropsch synthesis; this tail gas 22 is combined with a flow of air provided by an air blower 24. The combustion takes place over a combustion catalyst within adjacent flow channels within the reforming reactor 20. The combustion gas path is co-current relative to the reformer gas path.

A mixture of carbon monoxide and hydrogen at above 800° C. emerges from the reformer 20 and is quenched to below 400° C. by passing it through a steam raising heat exchanger 26. Water is supplied to this heat exchanger 26 by a pump 28, and the steam for the reforming process is hence supplied through a control valve 30 to the mixer 14. The gas mixture is further cooled in a heat exchanger 32 with cooling water to about 60° C., so the excess water condenses and is separated by passage through a cyclone 33 and a separator vessel 34. The gas mixture is then compressed by a compressor 36 to about 2.5 times the pressure, and is again cooled by a heat exchanger 40 before passing through a second cyclone 41 and a separator vessel 42 to remove any water that condenses. The separated water is re-cycled back to the steam raising circuit. The gas is then compressed to 20 atmospheres (2.0 MPa) in a second compressor 44.

The stream of high pressure carbon monoxide and hydrogen is then fed to a catalytic Fischer-Tropsch reactor 50, this again being a compact catalytic reactor formed from a stack of plates as described above; the reactant mixture flows through one set of channels, while a coolant flows through the other set.

The reaction products from the Fischer-Tropsch synthesis, predominantly water and hydrocarbons such as paraffins, are cooled to condense the liquids by passage through a heat exchanger 54 and a cyclone separator 56 followed by a separating chamber 58 in which the three phases water, hydrocarbons and tail gases separate, and the hydrocarbon product is stabilised at atmospheric pressure. The hydrocarbons that remain in the gas phase and excess hydrogen gas (the Fischer-Tropsch tail gases 22) are collected and split. A proportion passes through a pressure reduction valve 60 to provide the fuel for the catalytic combustion process in the reformer 20 (as described above). The remaining tail gases 62 are fed to a gas turbine 63 which drives an electrical power generator 64.

The gas turbine 64 generates all the power for the plant and has the capacity to export a surplus. The major plant electrical power needs are the compressors 36 and 44, and the pumps 24 and 28; electricity may also be used to operate a vacuum distillation unit to provide process water for steam generation.

Figure 2:
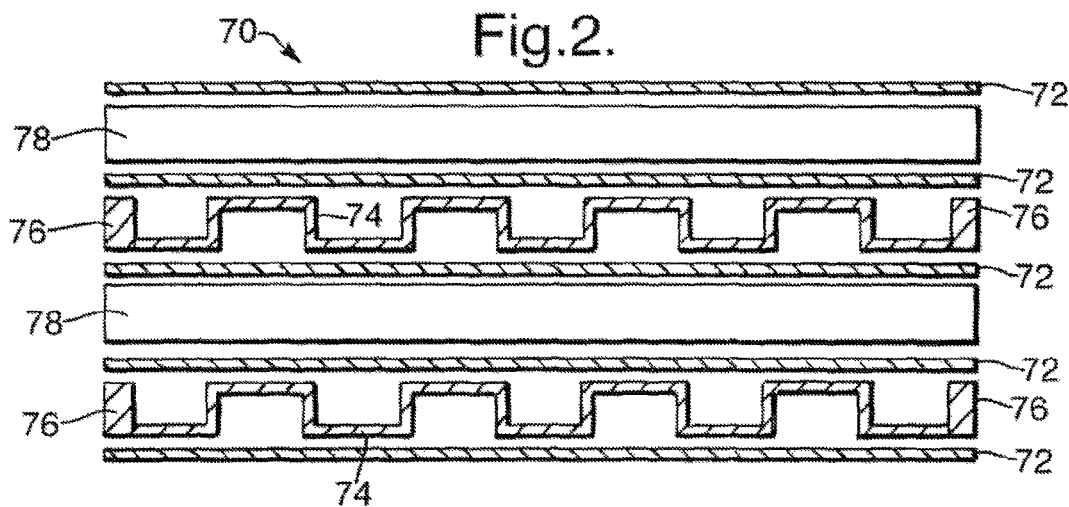
FIG. 2 shows a sectional view of part of a reactor block suitable for Fischer-Tropsch synthesis.

Referring now to FIG. 2 there is shown a reactor block 70 suitable for use in the Fischer-Tropsch reactor 50, the reactor block 70 being shown in section and with the components separated for clarity. The reactor block 70 consists of a stack of flat plates 72 of thickness 1 mm spaced apart so as to define channels for a coolant fluid alternating with channels for the Fischer-Tropsch synthesis. The coolant fluid channels are defined by castellated plates 74 of thickness 0.75 mm. The height of the castellations (typically in the range 1 to 4 mm) is 2 mm in this example, and 2 mm thick solid edge strips 76 are provided along the sides, and successive ligaments are 6 mm apart (the arrangement being described in more detail below). The channels for the Fischer-Tropsch synthesis are of height 5 mm, being defined by bars 78 of square cross-section, 5 mm high, spaced apart by 350 mm and so defining straight through channels.

Figure 3:
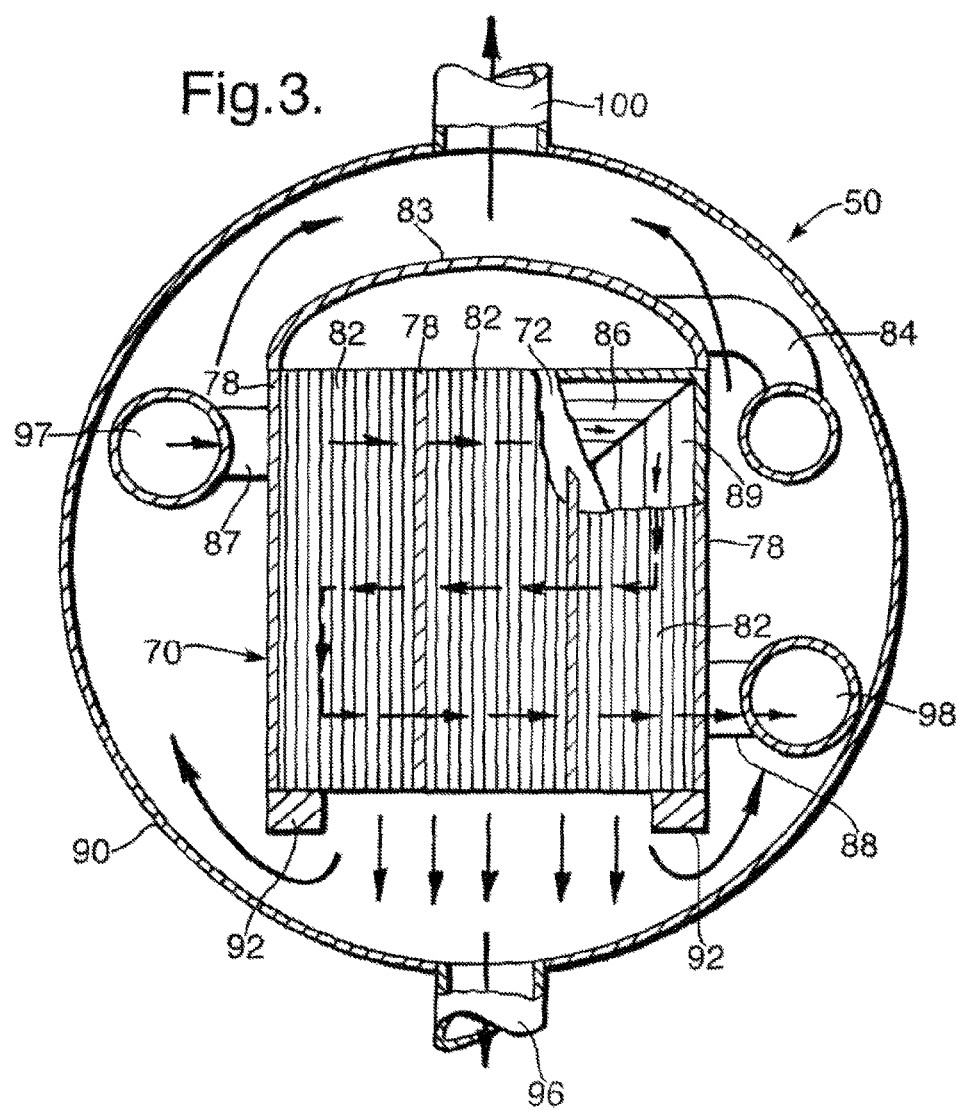
FIG. 3 shows a sectional view of a reactor incorporating the reactor block of FIG. 2.

Referring now to FIG. 3, the reactor 50 is shown in section, with the reactor block 70 partly broken away. As mentioned above, the reactor block 70 consists of a stack of flat plates 72 separated from each other to define flow channels. The orientations of alternate channels in the stack are generally orthogonal. Each flat plate 72 is 1.0 mm thick and 1070 mm square. The channels for the Fischer-Tropsch reaction contain catalyst-carrying corrugated foils 82, and extend straight through the reactor block 70 (from top to bottom as shown) from a header 83 to which the syngas mixture is provided at elevated pressure through a pipe 84; the flat plates 72 are held apart by bars 78 that are 5 mm square in cross-section, running from top to bottom, at a spacing of 350 mm, so there are three such channels side-by-side between successive flat plates 72. For the coolant channels the flat plates 72 are held apart by castellated sheets 74; the coolant channels are constructed from a long strip of 0.25 mm thick sheet formed into 2 mm high castellations that are 6 mm wide running along its length. The castellated strip is cut into lengths 86 and these are laid side by side to define transverse flow paths (in horizontal directions as shown), so as to provide a path between an inlet port 87 and an outlet port 88. The ends of the castellated strip 86 next to these ports 87 and 88 are cut square; the other ends are cut at 45°, and triangular pieces 89 of the castellated strip are arranged to provide links between them. Hence the overall flow path for the coolant, as shown by the broken arrows, is a zig-zag path that is partially co-current relative to the flow in the Fischer-Tropsch channels. The flat plates 72, the bars 78, and the castellated strips 86 and 89 may be of aluminium alloy, for example 3003 grade (aluminium with about 1.2% manganese and 0.1% copper).

The stack is assembled as described above, and then bonded together to form the reactor block 70 for example by brazing. The corrugated metal foil catalyst carriers 82, which incorporate an appropriate catalyst, are then inserted into the channels for the Fischer-Tropsch synthesis.

The broken arrows in FIG. 3 indicate that the reactor block 70 allows the coolant to pass three times across the width of the Fischer-Tropsch channels, in passing between the inlet 87 and the outlet 88; alternatively the coolant might pass just twice across the width, or yet again the coolant might pass more than three times. The closely spaced castellations in the coolant channels provide rigidity to resist bending.

The reactor block 70 is mounted within a carbon steel pressure vessel 90, being supported by support bars 92. The inside surface of the pressure vessel 90 may be coated, for example with chromium, to suppress corrosion or the formation of iron carbonyl. The pressure vessel 90 may be cylindrical with hemispherical ends. The pipe 84 for the syngas, and pipes 97 and 98 providing coolant to and from the ports 87 and 88, extend through the wall of the pressure vessel 90. There is an outlet port 96 for liquid products at the base of the vessel 90, and an outlet port 100 for gaseous products at the top of the vessel 90.

In use of the reactor 50 the coolant may be supplied at 0.7 MPa, and the syngas is supplied 2.0 MPa. The products of the Fischer-Tropsch synthesis, and unreacted gases, emerge into the pressure vessel 90 from the bottom of the reactor block 70, and so the pressure within the pressure vessel 90 is also about 2.0 MPa. Liquid droplets carried by the gas stream emerging from the reactor block 70 disengage from the bulk gas flow as the velocity decreases and fall down to the bottom; liquid droplets may instead impact with surfaces within the pressure vessel 90 and coalesce; and so liquid flows down to the bottom and out of the outlet port 96. The remaining gases emerge through the outlet port 100 and are treated as described in relation to FIG. 1.

To supplement the liquid/gas separation mechanisms mentioned above, demisting packings may also be provided within the pressure vessel 90. Alternatively or additionally a cyclonic separator may be installed within the pressure vessel 90, this having a tangential inlet through which the gas stream (which may contain droplets) enters, a gas outlet connected to the outlet port 100, and a liquid outlet for de-entrained liquid droplets, this preferably communicating through a pipe to below the level of the liquid products at the base of the vessel 90.

It will be appreciated that the use of the external pressure shell 90 helps to reduce the requirement for metal to provide strength to the reactor block 70, as no parts of the reactor block are required to resist tension forces. The coolant channels are under compression, but are held substantially rigid by the castellated strips 74. The pressure shell 90 hence enables a higher load of catalyst per unit volume to be achieved. This is because the plates such as 72 can be significantly thinner, so that a larger proportion of the volume of the reactor block is occupied by flow channels, thereby increasing the voidage, so that the overall catalyst inventory can be increased. For example in this Fischer-Tropsch reactor the proportion of the volume consisting of structural material may be reduced from more than 70% to less than 35%. It also minimises the bending moment in the walls of the flow channels, thereby reducing distortion, so improving contact between the catalyst foil 82 and the adjacent walls and so improving heat transfer, and also making removal or insertion easier. It will be appreciated that the pressure shell 90 has a comparatively simple geometry, so that it can be designed to existing pressure vessel codes. Also it inherently provides a secondary containment in the event of leakage from the reactor block 70; it is of a shape that is easy to insulate, and easy to transport and install; and the overall size of the reactor is not significantly increased.

In the case of the Fischer-Tropsch reactor 50 as shown in FIG. 3 there is the benefit that the space between the reactor block 70 and the shell 90 may be used to initiate phase disengagement between gaseous and liquid reaction products, so reducing the volume and expense of the subsequent product separators. There is the further benefit that comparatively low-cost material such as aluminium can be used to form the reactor block 70. A further benefit is that since no header provided at the lower end of the reactor block 70 (as shown), replacement of the catalyst foils 82 can be achieved easily once the pressure vessel 90 has been opened.

The invention claimed is:

1. A compact catalytic reactor for Fischer-Tropsch synthesis comprising a reactor module defining a multiplicity of first and second flow channels arranged alternately in the module, for carrying first and second fluids respectively, the first fluid being a gas mixture which undergoes Fischer-Tropsch synthesis and whose pressure is above ambient pressure, and the second fluid being a coolant fluid; wherein each flow channel in which a chemical reaction is to take place extends straight through the reactor module from top to bottom, and contains a catalyst for the Fischer-Tropsch synthesis reaction; wherein the reactor module is enclosed within a pressure vessel, the pressure within the pressure vessel being arranged to be at a pressure substantially equal to that in the Fischer-Tropsch synthesis reaction channels, and wherein at least three pipes provide fluid communication with the reactor module, and extend outward through the wall of the pressure vessel.

2. A reactor as claimed in claim 1 wherein the gas mixture is arranged to flow through at least part of the pressure vessel either to reach the flow channels for the synthesis reaction or to leave the flow channels for the synthesis reaction.

3. A reactor as claimed in claim 2 wherein the gas mixture that has undergone the synthesis reaction is then arranged to flow through the pressure vessel, the pressure vessel thereby providing a first stage of separation between liquid droplets and gaseous product.

4. A reactor as claimed in claim 1 wherein the pressure shell is of a different material to the reactor module.

5. A reactor as claimed in claim 1 wherein the proportion of the volume of the reactor module consisting of structural material is less than 60%.

6. A reactor as claimed in claim 5 wherein the said proportion is less than 50%.

7. A reactor as claimed in claim 1 wherein each flow channel in which the synthesis reaction is to take place is defined by flat plates held apart by bars of by castellated sheets.

8. A reactor as claimed in claim 7 wherein the flat plates are separated by less than 10 mm.

9. A reactor as claimed in claim 1 wherein each flow channel for a coolant fluid is defined by flat plates held apart by castellated sheets.

10. A reactor as claimed in claim 1 wherein the components defining the first and the second flow channels comprise an aluminium alloy.

11. A plant for converting natural gas to longer chain hydrocarbons incorporating a steam reforming reactor to generate a synthesis gas, and a Fischer-Tropsch reactor as claimed in claim 1 for generating longer chain hydrocarbons.

12. A reactor as claimed in claim 1 wherein each second flow channel passes at least twice across the width of the reactor module.

13. A reactor as claimed in claim 9 wherein each second flow channel passes at least twice across the width of the reactor module.

14. A reactor as claimed in claim 3 wherein the pressure vessel defines outlet ports for the liquid products and the gaseous products of the Fischer-Tropsch synthesis.

15. A compact catalytic reactor for Fischer-Tropsch synthesis comprising a reactor block defining a multiplicity of first and second flow channels arranged alternately in the block, for carrying first and second fluids respectively, the first fluid being a gas mixture which undergoes Fischer-Tropsch synthesis and whose pressure is above ambient pressure, and the second fluid being a coolant fluid;

wherein each flow channel in which a chemical reaction is to take place extends straight through the reactor block from top to bottom, and contains a catalyst for the Fischer-Tropsch synthesis reaction;

wherein the reactor block is enclosed within a pressure vessel, the pressure within the pressure vessel being arranged to be at a pressure substantially equal to that in the Fischer-Tropsch synthesis reaction channels.

* * * * *